US006934278B1

(12) United States Patent
Champa et al.

(10) Patent No.: US 6,934,278 B1
(45) Date of Patent: Aug. 23, 2005

(54) MULTIMEDIA INTERFACE FOR A COMMUNICATIONS NETWORK

(75) Inventors: John J. Champa, Dearborn, MI (US); Daniel A. Shyti, Sterling, VA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/221,447

(22) Filed: Dec. 28, 1998

(51) Int. Cl.[7] .............................................. H04L 12/66
(52) U.S. Cl. ................. 370/352; 379/88.13; 379/93.21; 709/204; 348/14.08
(58) Field of Search ................................ 370/493, 495, 370/497, 465, 466, 467, 487, 353, 354, 355, 356, 391, 395.3, 469, 395.5, 401, 395.52, 395.53, 463, 481, 494, 264, 352; 379/93.05, 88.13, 93.08, 88.23, 93.09, 93.21; 345/853; 455/557, 556; 709/225, 223, 238, 217, 231, 234, 236, 204; 348/14.08, 14.05, 14.12, 14.13, 14.15

(56) References Cited

U.S. PATENT DOCUMENTS

| | | | | | |
|---|---|---|---|---|---|
| 5,206,859 | A | * | 4/1993 | Anzai ....................... | 348/14.11 |
| 5,389,965 | A | * | 2/1995 | Kuzma ..................... | 348/14.05 |
| 5,497,373 | A | * | 3/1996 | Hulen et al. ................ | 370/259 |
| 5,519,640 | A | * | 5/1996 | Ganesan et al. ............ | 709/231 |
| 5,610,910 | A | * | 3/1997 | Focsaneanu et al. ........ | 370/351 |
| 5,677,728 | A | * | 10/1997 | Schoolman ............... | 379/93.17 |
| 5,689,553 | A | * | 11/1997 | Ahuja et al. ............. | 348/14.09 |
| 5,706,290 | A | * | 1/1998 | Shaw et al. ................. | 345/723 |
| 5,708,659 | A | * | 1/1998 | Rostoker et al. ............ | 370/392 |
| 5,761,294 | A | * | 6/1998 | Shaffer et al. ............... | 370/271 |
| 5,768,350 | A | * | 6/1998 | Venkatakrishnan ......... | 370/418 |
| 5,805,636 | A | * | 9/1998 | Rao et al. ................... | 375/222 |
| 5,892,764 | A | * | 4/1999 | Riemann et al. ....... | 370/395.52 |
| 5,966,427 | A | * | 10/1999 | Shaffer et al. ................ | 379/21 |

(Continued)

FOREIGN PATENT DOCUMENTS

WO    WO 97/47119    * 12/1997    ............ H04M/3/42

OTHER PUBLICATIONS

Gary A. Thom, H.323: The Multimedia Communications Standard for Local Area Networks, Dec. 1996, IEEE Communication Magazine, pp. 52–56.*
*Computer Telephony*, Oct. 1997, pp. 81–85 and 87–90.

*Primary Examiner*—Duc Ho
*Assistant Examiner*—Phuongchau Ba Nguyen
(74) *Attorney, Agent, or Firm*—Lise A. Rode; Mark T. Starr; David G. Rasmussen (57) ABSTRACT

A multimedia interface circuit is used to connect multimedia signal sources such as a telephone to a network. The multimedia interface circuit has a telephone communication interface circuit for receiving the telephone signal from the telephone. A signal conditioner receives the signal from the telephone communication interface circuit and conditions it for use on the network. A phone environment simulator cooperates with the signal conditioner to add an artificially simulated phone environment to the signal. The signal is then sent by a network communication circuit to the network. Personal computers and video sources may also be connected by the multimedia interface circuit to the network.

17 Claims, 4 Drawing Sheets

U.S. PATENT DOCUMENTS

| | | | | |
|---|---|---|---|---|
| 5,974,043 A | * | 10/1999 | Solomon | 370/352 |
| 5,999,985 A | * | 12/1999 | Sebestyen | 370/465 |
| 6,011,579 A | * | 1/2000 | Newlin | 379/93.21 |
| 6,044,403 A | * | 3/2000 | Gerszberg et al. | 709/217 |
| 6,046,762 A | * | 4/2000 | Sonesh et al. | 379/93.21 |
| 6,064,653 A | * | 5/2000 | Farris | 370/237 |
| 6,075,784 A | * | 6/2000 | Frankel et al. | 370/352 |
| 6,122,255 A | * | 9/2000 | Bartholomew et al. | 370/237 |
| 6,122,665 A | * | 9/2000 | Bar et al. | 709/224 |
| 6,130,880 A | * | 10/2000 | Naudus et al. | 370/235 |
| 6,141,341 A | * | 10/2000 | Jones et al. | 370/352 |
| 6,163,531 A | * | 12/2000 | Kumar | 370/260 |
| 6,185,288 B1 | * | 2/2001 | Wong | 370/352 |
| 6,215,515 B1 | * | 4/2001 | Voois et al. | 379/93.21 |
| 6,246,490 B1 | * | 6/2001 | Sebestyen | 370/469 |
| 6,259,449 B1 | * | 7/2001 | Saxena et al. | 345/853 |
| 6,266,782 B1 | * | 7/2001 | Carter et al. | 370/467 |
| 6,295,293 B1 | * | 9/2001 | Tonnby et al. | 370/389 |
| 6,324,265 B1 | * | 11/2001 | Christie et al. | 379/88.23 |
| 6,324,280 B2 | * | 11/2001 | Dunn et al. | 379/230 |
| 6,335,927 B1 | * | 1/2002 | Elliott et al. | 370/352 |
| 6,377,818 B2 | * | 4/2002 | Irube et al. | 455/556 |
| 6,430,176 B1 | * | 8/2002 | Christie, IV | 370/355 |
| 6,449,260 B1 | * | 9/2002 | Sassin et al. | 370/352 |
| 6,452,922 B1 | * | 9/2002 | Ho | 370/352 |
| 6,549,534 B1 | * | 4/2003 | Shaffer et al. | 370/355 |

* cited by examiner

MULTIMEDIA INTERFACE FOR A COMMUNICATIONS NETWORK

BACKGROUND OF INVENTION

1. Field of the Invention

The present invention relates to a common multimedia interface (MMIF) circuit that allows any signal source, whether it be an analog phone, digital phone, PC, or video device, to be connected through the MMIF circuit to a network such as an intranet.

2. Description of the Related Art

A communication system in an office or site environment may have a variety of signal sources such as analog and digital telephones, PC's, and video sources that all need to be connected to a network, for example an intranet. An intranet is a private network built around internet technology and standards. An example would be a government agency that may have a variety of offices in a number of locations that are all connected by an intranet.

Figure 1:
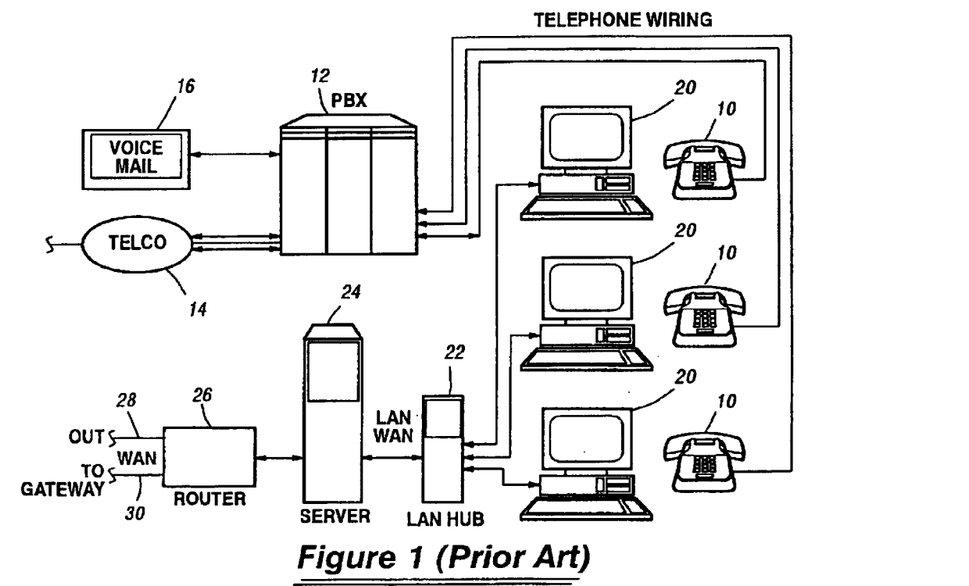
FIG. 1 is a block diagram of a prior art office environment having an analog telephone system in parallel with a digital LAN.

FIG. 1 shows a typical prior art office environment having an analog telephone system in parallel with a digital local area network (LAN) using, for example, Ethernet protocol to which personal computers (PCs) are connected. The disadvantage of this system is that the analog phone system and digital LAN network have separate transmission lines.

Figure 2:
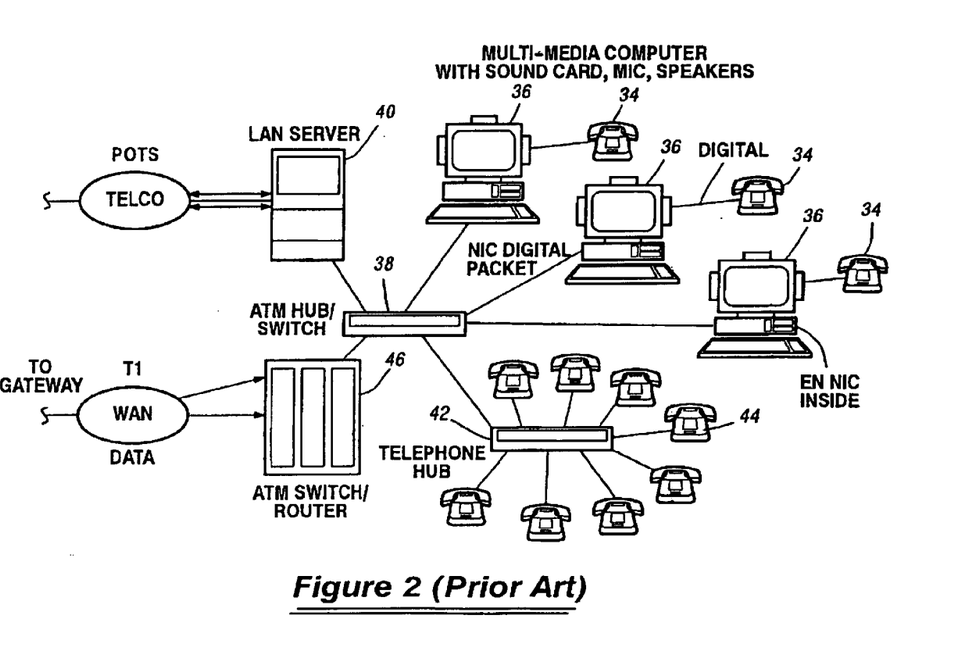
FIG. 2 is a block diagram of a more advanced prior art communication LAN using one digital transmission line in which telephones are connected through multimedia PCs to the LAN.

FIG. 2 shows a more advanced prior art communication system in which one set of transmission lines is eliminated. Telephones are connected through multimedia PCs to the LAN thus eliminating one set of transmission lines. The disadvantage of having the analog telephones go through the PCs is that this requires adding a telephone interface card to the PC. Secondly, if the PC fails, the phone is unusable. In addition, when the phone is in operation the PC operation is degraded.

Figure 3:
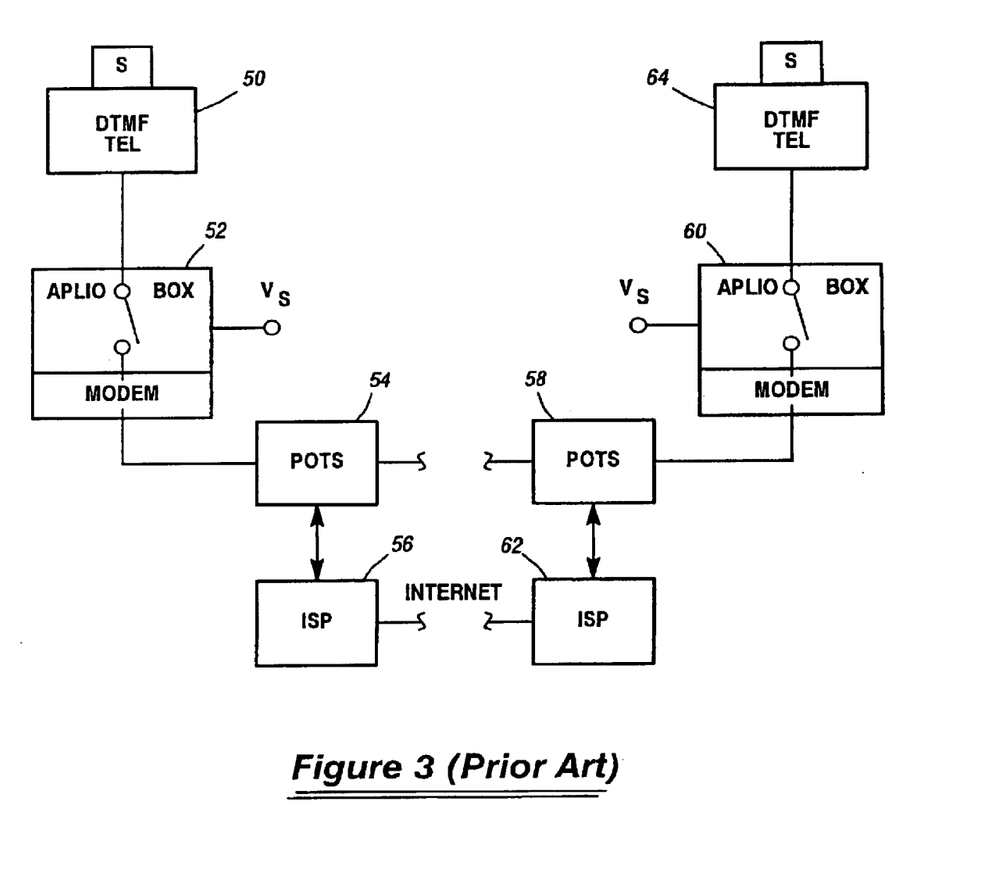
FIG. 3 is a schematic drawing of a state of the art system that provides long distance telephone calls over the internet.

FIG. 3 is a schematic drawing of the latest state of the art system that provides long distance telephone calls over the internet. The system connects the telephone to a "box" which performs a long distance call over the internet to another "box" which has a phone connected to it. The disadvantage of this system is the reliability of connections over the internet for a telephone call.

What would be desirable is a communication system in an office environment in which each signal source connects through its own standard interface box to the network such that each signal source may communicate to any other signal source without having to modify any of the signal sources.

SUMMARY OF THE INVENTION

The present invention provides a common multimedia interface (MMIF) circuit in a box that allows any signal source, whether it be an analog phone, digital phone, PC, or video device, to be connected through the MMIF circuit to a LAN network such as an intranet. After connection they can be connected through the intranet to any other signal source connected to a similar MMIF circuit. Each MMIF circuit has an input port for each of the signal sources. None of the signal sources needs to be modified to connect to an MMIF circuit.

The MMIF circuit has telephone, computer, and video ports for receiving and transmitting telephone, computer, and video signals. The MMIF circuit operates with only one signal source at a time. If a telephone is connected, a telephone communication interface circuit receives the telephone signals from the telephone port. Then a signal conditioner receives the telephone signal from the telephone communication interface circuit. The signal conditioner has a transcoder to receive the telephone signal if it is digital and a voice codec to receive the telephone signal if it is analog. The transcoder conditions and compresses the digital telephone signal and sends it to a voice packetizer. The voice codec converts the analog telephone signal to a digital signal, compresses the signal, conditions it and sends it to the voice packetizer. In addition the transcoder and voice codec cooperate with a telephone digital signal processor to receive the digital signal and add an artificially simulated phone environment to the digital telephone signal.

The voice packetizer packetizes the compressed digital telephone signal. A network interface receives the packetized digital telephone signal and formats it to be compatible with the network. If the network is an intranet, the signal then goes to a network port connected to the intranet. The telephone signal is routed to the correct internet protocol address (IP address) for the telephone to be connected to. The telephone signal then goes through an MMIF circuit for the phone to be connected to in the reverse direction. The two phones are now connected via the intranet.

If a computer, for example a PC, is connected to the MMIF circuit the computer port receives signals from the computer and provides them to the network interface. The network interface forwards the computer signals through the network port to the intranet. The computer signal is routed to the correct internet IP address for the second computer to be connected to. The computer signal then goes through an MMIF circuit for the second computer in the reverse direction. The two computers are now connected via the intranet.

If a video source, for example a camera, is connected to the MMIF circuit a video port receives signals from the camera and provides them to the to a video codec which compresses the signal and forwards it to a video packetizer which packetizes the signal and sends it to the network interface. From there the video signal is routed to the correct internet IP address whether it be through the network port to the intranet or through a computer port to a computer with an MMIF circuit.

DETAILED DESCRIPTION OF THE INVENTION

FIG. 1 shows a typical prior art office environment having an analog telephone system in parallel with a digital LAN using, for example, Ethernet protocol to which personal computers (PCs) are connected. The analog phone system and digital LAN have separate transmission lines. In FIG. 1 telephones 10 are connected to a private branch exchange (PBX) switching system 12 that may switch phone calls to the public telephone company service (POTS) 14 or to other services such as voice mail system 16.

Each PC 20 has an internal network interface card (NIC) that connects through to an RJ 45 jack to a cable extending to an LAN hub 22 which acts as a distribution point for the signal to server 24 or to other servers and PCs. Server 24 is connected by a LAN to the LAN hub 22. Server 24 is typically a high end PC that contains applications that it will provide through a router 26 to a LAN 28 or WAN 30.

The big disadvantage of the parallel systems of FIG. 1 is that two separate side by side transmission lines are needed.

FIG. 2 shows a more advanced prior art communication system in which one transmission line is eliminated. Telephones are connected through multimedia PCs to the LAN thus eliminating one transmission line. Looking more closely at FIG. 2, telephones 34 are connected to telephone interface cards in multimedia PCs 36. The telephone interface cards digitize and packetize the phone signal. Each PC provides a digital signal to an asynchronous transfer mode (ATM) high-speed hub switch 38. This switch routes the PC digital signal to an outside telephone POTS line through LAN server 40, to a private branch exchange (PBX) telephone hub 42 and phones 44 (either digital or analog), or to a WAN or other network through an ATM switch 46.

The disadvantage of having the telephones go through the PCs is that this requires adding a telephone interface card to the PC for the phone to be connected to. Secondly, if the PC fails, the phone is unusable. In addition, when the phone is in operation the PC operation is degraded and vice-versa.

FIG. 3 is a schematic drawing of the latest state of the art system that provides long distance telephone calls over the internet. APLIO INC. of San Bruno Calif. manufactures the system. This system connects the telephone to a "box" which performs the long distance call over the internet to another "box" which has a phone connected to it. In FIG. 3, an APLIO box 52 is connected in series between a telephone 50 and ordinary telephone service (POTS) station 54. POTS station 54 can dial and receive internet protocol (IP) addresses through internet service provider ISP 56 and also communicate with POTS location 58. An APLIO box 60 is connected to POTS location 58. In addition, POTS location 58 can dial and receive IP addresses through internet service provider ISP 62. Telephone 64 is connected to APLIO box 60.

The procedures to make an internet telephone call are as follows:

1. Pick up the receiver for telephone 50.
2. Dial in the telephone number of telephone 64 which has APLIO black box 60 connected.
3. When the call goes through, the parties agree that one party will make the internet call on the "master" box. (e.g. APLIO box 52).
4. The party with the master APLIO box 52 presses the call button on box 52.
5. APLIO box 52 connects to APLIO box 60 through POTS locations 54, 58. Master APLIO box 52 provides an indication to both parties to hang up the telephones 50 and 64.
6. After telephones 50,64 are hung up APLIO boxes 52,60 take over.
7. Master APLIO box 52 logs onto the internet with its ISP user number and password.
8. APLIO boxes 52,60 find a common server on the internet.
9. Both APLIO boxes 52,60 check into the common server and provide identifier numbers and their IP addresses to the server.
10. Both APLIO boxes 52,60 dial their own local ISP telephone number for a point to point protocol (PPP) connection.
11. APLIO boxes 52,60 both make local connection to the internet through their own ISP and find the common server.
12. The master APLIO box 52 presents its serial number and identifier number and the serial number of the slave box.
13. The master APLIO box 52 establishes a socket connection through the internet into the slave box 60. The connection is box to box.
14. Both APLIO boxes 52,60 ring the bell tone on their respectively connected telephones 50,64.
15. As each party picks up his phone he connects through his APLIO box to the internet to consummate the internet telephone call.
16. When the call is complete each party hangs up.
17. APLIO boxes 52,60 log off the internet.

(Note: steps originally numbered 8–16 in source)

This system is used to make calls over the internet and not to provide communications within an intranet system.

Figure 4:
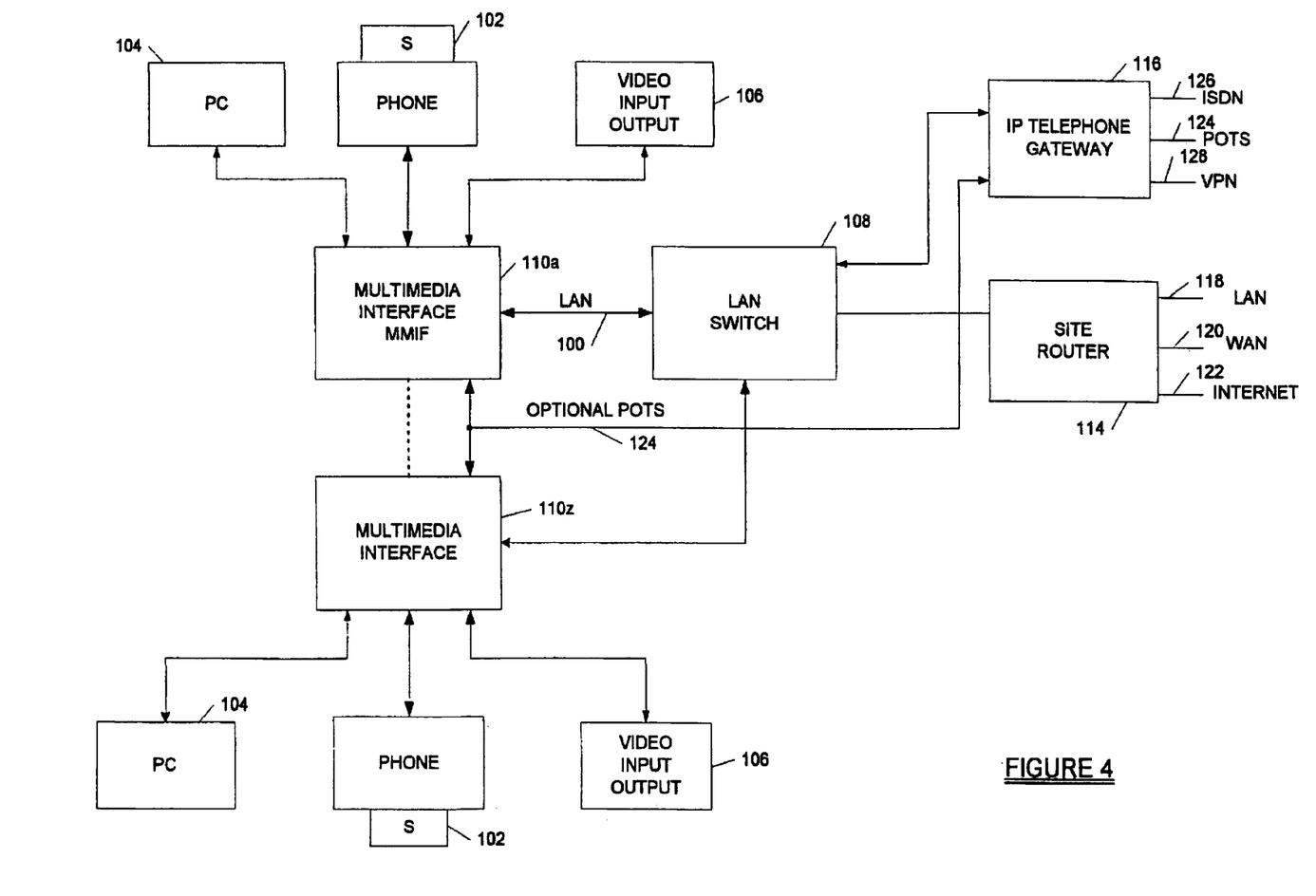
FIG. 4 is a block diagram of an office communications system that incorporates the multimedia interface of the invention to connect multimedia signal sources to a LAN.

FIG. 4. Shows a typical office communications system connected together by a LAN 100 that may be any network, for example, an intranet. For descriptive purposes an intranet will be described. The system has the following communication signal sources; telephone 102, personal computer (PC) 104 and video source 106. The hub for intranet LAN 100 is LAN switch 108. An example of a LAN switch would be an Ethernet or ATM switch. LAN switches are well known in the art and available from Intel Corporation or Cisco Corporation.

Multimedia interface (MMIF) circuits 110*a–z* form the heart of the present invention. The MMIF circuits allow any signal source having an IP address to be connected through intranet LAN 100 to any other signal source having an IP address without having to modify any of the signal sources. For example, an analog telephone at one IP address of intranet LAN 100 can be connected with a digital telephone at another IP address without the need to go through a PC as is needed in the prior art. Each MMIF circuit 110*a–z* has an input for each of the signal sources. For example, MMIF 110*a* has inputs for telephone, personal computer and video signals 102, 104, and 106 respectively. Only one of the sources can be connected to MMIF circuit 110*a* at a time. Each signal source connected to intranet LAN 100 has its own MMIF circuit 110*a*–110*z*.

LAN switch 108 also allows access from intranet LAN 100 to the outside world through site router 114 and IP telephone gateway 116. These do not form part of the invention. Site router 114 allows access to other networks including local area network LAN 118, wide area network WAN 120, and internet 122. IP telephone gateway 116 allows telephone service to the telephone company (i.e. POTS) 124, integrated service digital network (ISDN) 126 and virtual private network (VPN) 128. IP gateway servers are well known and are available from Lucent Technologies.

Figure 5:
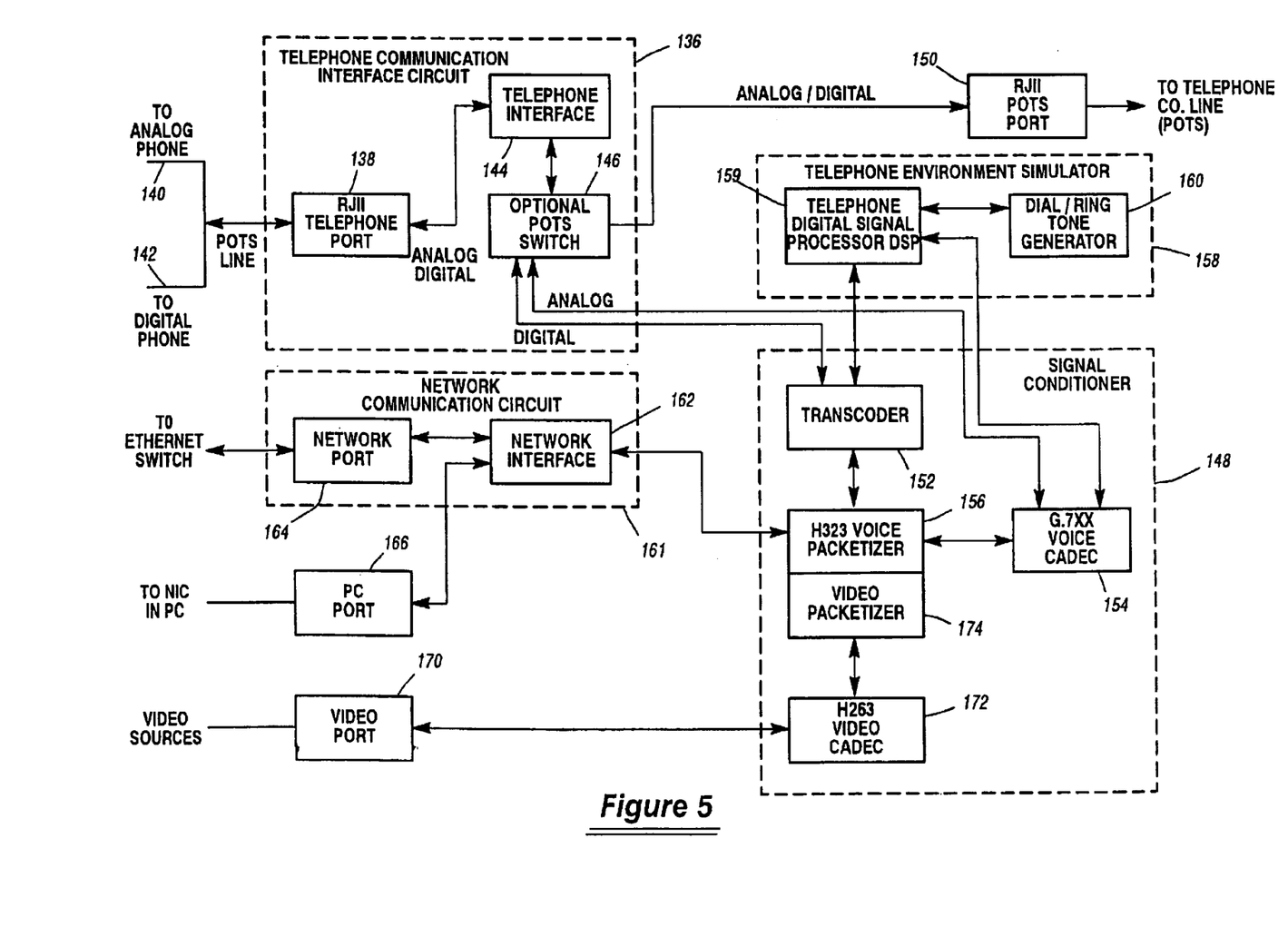
FIG. 5 is a schematic diagram of the multimedia interface of FIG. 5.

FIG. 5 is a block diagram of the MMIF circuit 110*a* shown in FIG. 4. Assume that a telephone is connected to MMIF circuit 110*a*. Telephone communication interface circuit 136 receives an analog phone input 140 or a digital phone input 142 from the phone 102 shown in FIG. 4. The phone has an IP address on intranet LAN 100. Telephone communication interface circuit 136 is made up of RJ11 telephone port 138, telephone interface 144 (i.e. packet handler interface) and POTS switch 146. The purpose of telephone communication interface circuit 136 is to process the incoming telephone signal and provide the telephone signal to signal conditioner 148 or to POTS port 150.

RJ11 telephone port 138 is a common telephone six conductor modular jack that is typically wired for four conductors. The analog or digital phone signal from RJ11 port 138 is provided to a telephone interface 144 which recognizes whether the phone signal is analog or digital and whether there are any control signals. The phone signals and any control signals are forwarded to POTS switch 146. The POTS switch recognizes from the control signal whether to route the signal to signal conditioner 148 or to RJ11 port 150 which is connected to the ordinary outside telephone POTS service. If the phone signal is meant to go straight to the outside telephone POTS lines then the signal goes to RJ11 port 150. RJ11 port 150 is shown in FIG. 4 as IP telephone gateway 116 and outside telephone POTS line 124. If the phone signal is meant to be used on the intranet LAN 100, the signal goes to transcoder 152 or G.7xx voice codec 154 which are part of signal conditioner 148. The signal goes to transcoder 152 if it is digital and to voice codec 154 if it is analog. Both signals then go to voice packetizer 156 (i.e. IP voice packetizer). The purpose of signal conditioner 148 for a signal coming from the POTS switch 146 is to preprocess, compress, digitize, and packetize to internet protocol (IP) (or other protocol depending on the LAN). The preprocessing is normally for signal enhancement to replace portions of the signal corrupted during signal conditioning. For a signal in the opposite the process is reversed. Transcoder 152 converts the digital phone signal from a propriety digital signal to a standard digital audio signal recognizable by the voice packetizer. In addition, the transcoder may perform signal enhancement and compression on the signal. Voice codec 154 performs signal enhancement and compression on the phone signal. An example of the voice codec is an HMP 8201 manufactured by Harris Semiconductor. The outputs of voice codec 154 and transcoder 152 are compressed digital signals provided to H.323 voice packetizer 156 that packetizes the digital signal. Voice packetizer 156 is a commercially available chip set, H323, manufactured by Hewlett Packard. Transcoders are comercially available from Accord Video Telecommunications LTD located in Petach-Tivka, Israel.

Voice codec 154 and transcoder 152 also communicate with telephone environment simulator 158 that is made up of telephone digital signal processor (DSP) 159 and tone generator 160. DSP 159 receives a ring tone, dial tone and white noise from tone generator 160. DSP 159 adds these signals to the digital phone signals in voice codec 154 and transcoder 152. The purpose is to artificially simulate a phone environment since there is no audio noise in a digital phone system. Alternatively, dial and ring tones could be stored in permanent memory in DSP 159 or other storage location as is known in the art.

Voice packetizer 156 provides digital packets to network communication circuit 161 which includes network interface 162 (e.g. internal Ethernet interface) and network port 164. Network interface 164 puts the digital packets in the proper format to be applied to network port 164 and to intranet LAN 100 (shown in FIG. 4). Network port 164 is a network interface card (NIC). The telephone signal will be directed to the correct IP address of the telephone to be connected to by LAN switch 108 (shown in FIG. 4). The latter telephone needs to be connected to the intranet LAN by an MMIF circuit also.

If PC 104, shown in FIG. 4, is connected to MMIF circuit 10a and wants to connect to a second PC on intranet LAN 100, the second PC needs to be connected to the LAN through an MMIF circuit. In addition both PCs need to have IP addresses. PC 104 is connected through its network interface card (NIC) to computer port 166 that is a NIC for network interface 162. In network interface 162 the PC signal is formatted to be applied to network port 164 and to LAN 100. The computer signal is sent to the IP address of the second computer.

If video source 106, shown in FIG. 4, is connected to MMIF circuit 110a and wants to be connected to second video device on intranet LAN 100, the second video device needs to be connected to the LAN through an MMIF circuit. In addition, both the video source and the second video device must have an IP address. Video source 106 is connected through video port 170 to an H 263 video codec 172, in signal conditioner 148, where the video signal is compressed. Hewlett Packard manufactures H 263 video codec 172. The compressed video signal is then sent to video packetizer 174 (i.e. IP voice packetizer) which packetizes the compressed video signal. The signal is then sent to network interface 162, which sends the signal through network port 164 to the second video device at the desired IP address.

In operation, a communication system in an office environment may have a variety of signal sources such as analog and digital telephones, PC's, or video sources which all need to be connected to an intranet network in the office, site or general location. An example would be a government agency that may have a variety of offices in a number of locations that are all connected by an intranet LAN. In the prior art described previously an analog phone would have to be connected to its own analog POTS network in the office or would have to be connected through a PC to digitize the phone signal so it could go on the intranet LAN. This required adding a communications card to the PC for the phone to be connected to. In addition, if the PC went down the phone was unusable. Also when the phone was in operation the PC operation was degraded.

The invention allows each of the signal sources to be connected to an MMIF circuit interchangeably. An operator simply plugs his telephone (analog or digital), PC or video device into any available MMIF circuit. The MMIF circuit automatically transfers the signal to the correct IP address on intranet LAN 100.

Looking more specifically at FIGS. 4 and 5, if a government employee has an analog phone and wants to connect to a second digital phone at another location on intranet LAN 100, he begins by plugging his analog phone into the telephone port 138 of one of MMIF circuits 110a–z. This circuit is connected to a node of intranet LAN 100 at a specified IP address. The employee dials the number of the second digital phone. This signal is passed through telephone port 138 and goes to telephone interface 144 that determines whether the telephone signal is digital or analog and looks for control signals. The signal is fed to optional POTS switch 146 which looks for a control signal and switches the signal either through RJ11 port 150 to outside POTS telephone service 124 or to signal conditioner 148. For example, a code may be dialed before the phone number that indicates if the phone call is to go to the outside POTS service.

In this case the phone signal is to go to an IP address of intranet 100, and since the signal is analog, it is sent to voice codec 148 for signal conditioning, compression and conversion to a digital signal.

At this point there is no ring tone or dial tone on the digital signal output of voice codec 148. These must be added so that someone answering the phone call will know there is a phone call on the line. Tone generator 158 provides the ring and dial tones to telephone DSP 159 that adds them to the digital signals of voice codec 148. The digital signal of voice codec 148 is then forwarded to voice packetizer 156 that packetizes the signal.

The packetized digital phone signal is fed to network interface 162 and to network port 164 which sends the signal to the LAN switch 108 which is the hub for intranet LAN 100. LAN switch 108 routes the phone signal to the correct IP address for the second digital telephone.

The second digital telephone is connected through an MMIF circuit to intranet LAN 100 also. The MMIF circuit for the digital phone receives the phone signal and processes the signal in the reverse direction to provide the phone signal to the digital phone. In this case the reverse signal would go through transcoder 152 since the receiving phone is digital. The phone signal has ring tone and dial tone and the source of the call is transparent as to whether it was from a digital or analog phone. This means analog or digital phones can be interchangeably connected at any IP address site on the intranet LAN 100.

If the employee wants to transfer files between PC 104 and a second PC, PC 104 is connected to the computer port of MMIF circuit 110a and the second PC is connected to the computer port of a second MMIF circuit. Both MMIF circuits are then connected to nodes at different IP addresses on the intranet LAN 100.

PC 104 is connected through its network interface card (NIC) to computer port 166 that is a NIC for network interface 162. There the PC signal is formatted to be applied to network port 164 which sends the signal to LAN switch 108 the hub for intranet LAN 100. LAN switch 108 routes the PC 104 computer signal to the correct IP address for the second PC.

Similar procedures are followed if the employee wants to connect a video signal source 106 to another video device on intranet LAN 106. Both devices need to be connected to MMIF circuits and have IP addresses on LAN 106. The MMIF circuits will route the signals through video port 170, video codec 172, and video packetizer 174 to the network interface. The signal then goes through the LAN to the correct IP address in the same way as the PC or telephone signal.

The advantage of the MMIF circuit to the employee is its simplicity. The employee may use one box to plug in his telephone, PC or video device to the LAN. There is no need to run the telephone through a PC to get to the intranet LAN as the prior art requires. This means that the PC does not need to be modified to handle telephones and its performance is not degraded when a phone call is made. In addition, the employee may use whatever telephone is available whether analog or digital to make calls. The type of telephone is transparent to the LAN.

While the preferred embodiments of the invention have been shown and described, numerous variations and alternative embodiments will occur to those skilled in the art. Accordingly, it is intended that the invention be limited only in terms of the appended claims.

We claim:

1. A multimedia interface circuit having ports for interchangeably connecting any one of a plurality of multimedia signal sources including a telephone to a network comprising, a telephone communication interface circuit, including a telephone interface, for receiving a telephone signal from said telephone, for determining if said telephone signal is analog or digital, and for interfacing said telephone signal to said multimedia interface circuit, a signal conditioner receiving the output of said telephone communication interface circuit for providing a compressed and packetized digital telephone signal as an output, a phone environment simulator communicating with said signal conditioner to add an artificially simulated phone environment to said digital telephone signal, a network communication circuit receiving said signal conditioner output for communicating said signal conditioner output to said network, a video port for receiving and transmitting video signals, said signal conditioner receiving the output of said video port, said signal conditioner for compressing and packetizing said video signal, said network communication circuit receiving said video signal output of said signal conditioner, said network communication circuit capable of providing said signal conditioner video output signal to said network, wherein any one of said plurality of multimedia signal sources connected to said multimedia interface circuit can be connected via said network to any of said plurality of multimedia signal sources connected to another said multimedia interface circuit.

2. A multimedia interface circuit having ports for interchangeably connecting any one of a plurality of multimedia signal sources including a telephone to a network comprising, a POTS port capable of being connected to a POTS telephone network;

a telephone communication interface circuit, including a telephone interface, for receiving a telephone signal from said telephone, for determining if said telephone signal is analog or digital, and for interfacing said telephone signal to said multimedia interface circuit, said telephone communication interface circuit including a POTS switch for receiving said telephone signal and for determining whether said telephone signal is to be routed to said POTS telephone network or to a signal conditioner, said signal conditioner receiving the output of said telephone communication interface circuit providing a compressed and packetized digital telephone signal as an output, a phone environment simulator communicating with said signal conditioner to add an artificially simulated phone environment to said digital telephone signal, and a network communication circuit receiving said signal conditioner output for communicating said signal conditioner output to said network, a video port for receiving and transmitting video signals, a video codec receiving the output of said video port, said video codec for compressing said video signal, a video packetizer receiving the output of said video codec, said video packetizer for packetizing the output of said video codec; and, said network communication circuit receiving the output of said video packetizer, said network communication circuit capable of providing said video packetizer signals to said network, wherein any one of said plurality of multimedia signal sources connected to said multimedia interface circuit can be connected via said network to any of said plurality of multimedia signal sources connected to another said multimedia interface circuit.

3. The multimedia interface circuit of claim 1 further comprising,
   a POTS port capable of being connected to a POTS telephone network, and
   a POTS switch in said telephone communication interface circuit for receiving said telephone signal and for determining whether said telephone signal is to be routed to said POTS telephone network or to the signal conditioner.

4. The multimedia interface circuit of claim 1 or 2 in which said telephone communication interface circuit includes,
   a telephone port for receiving said telephone signal, and providing said telephone said signal to said telephone interface.

5. The multimedia interface circuit of claim 4 in which said phone environment simulator includes,
   a digital signal processor receiving said digital telephone signal for adding an artificially simulated phone environment to said digital telephone signal.

6. The multimedia interface circuit of claim 5 in which said phone environment simulator includes a tone generator for producing said artificially simulated phone environment.

7. The multimedia interface circuit of claim 5 in which said phone environment simulator produces a ring tone and a dial tone.

8. The multimedia interface circuit of claim 6 in which said signal conditioner includes:
   a transcoder capable of receiving a digital telephone signal from said telephone communication interface circuit for transcoding and compressing said digital telephone signal,
   a voice codec capable of receiving an analog telephone signal from said telephone communication interface circuit for converting said analog telephone signal to a digital signal and compressing said digital telephone signal, and
   a voice packetizer capable of receiving said digital telephone signals from said transcoder and said voice codes for packetizing said digital telephone signals.

9. The multimedia interface circuit of claim 8 in which said network communication circuit includes,
   a network interface receiving said packetized digital telephone signal from said voice packetizer, for formatting said packetized digital telephone signal to be compatible with said network, and
   a network port connected to said network, said network port receiving said digital telephone signal from said network interface for providing said telephone signal to said network.

10. The multimedia interface circuit of claim 9 in which said network is an intranet.

11. The multimedia interface circuit of claim 1 having a computer port capable of receiving and transmitting computer signals, said computer port connected to said network interface, said network interface capable of providing said computer signals through said network port to said network.

12. The multimedia interface circuit of claim 2 including a computer port capable of receiving and transmitting computer signals, said computer port connected to said network interface, said network interface capable of providing said computer signals through said network port to said network.

13. A multimedia interface circuit for interchangeably connecting any one of a plurality of multimedia signal sources including a telephone to a network comprising:
   a telephone port for receiving a telephone signal;
   a telephone interface receiving said telephone signal from said telephone port for interfacing said telephone signal to said multimedia interface circuit and determining if said telephone signal is analog or digital;
   a transcoder capable of receiving a digital telephone signal from said telephone interface for transcoding and compressing said digital telephone signal;
   a voice codec capable of receiving an analog telephone signal from said telephone interface for converting said analog telephone signal to a digital signal and compressing said digital telephone signal;
   a voice packetizer capable of receiving said digital telephone signals from said transcoder and said voice codec for packetizing said digital telephone signals;
   a digital signal processor cooperating with said transcoder and said voice codec for adding an artificially simulated phone environment to said digital telephone signal,
   a network interface receiving said packetized digital telephone signal from said voice packetizer, for formatting said packetized digital telephone signal to be compatible with said network;
   a network port connected to said network, said network port receiving said digital telephone signal from said network interface;
   a video port for receiving and transmitting video signals;
   a video codec receiving the output of said video port, said video codec for compressing said video signal; and,
   a video packetizer receiving the output of said video codec, said video packetizer for packetizing the output of said video codec, said network interface receiving the output of said video packetizer, said network interface capable of providing said video packetizer signals though said network port to said network,
   wherein any one of said plurality of multimedia signal sources connected to said multimedia interface circuit can be connected via said network to any of said plurality of multimedia signal sources connected to another said multimedia interface circuit.

14. The multimedia interface circuit of claim 13 in which said network is an intranet.

15. The multimedia interface circuit of claim 13 in which said artificially simulated phone environment includes a ring and a dial tone.

16. The multimedia interface circuit of claim 13, including:
   a POTS port capable of being connected to a POTS telephone network; and,
   a POTS switch receiving said telephone signal from said telephone interface for determining whether said telephone signal is to be routed to said POTS telephone network or to the transcoder.

17. The multimedia interface circuit of claim 13 including,
   a computer port capable of receiving and transmitting computer signals, said computer port connected to said network interface, said network interface capable of providing said computer signals through said network port to said network.

* * * * *